(12) United States Patent
Onogi

(10) Patent No.: US 8,299,415 B2
(45) Date of Patent: Oct. 30, 2012

(54) PHOTODETECTOR, ELECTRO-OPTICAL DEVICE, AND ELECTRONIC APPARATUS

(75) Inventor: Tomohide Onogi, Chino (JP)

(73) Assignee: Sony Corporation, Tokyo (JP)

( * ) Notice: Subject to any disclaimer, the term of this patent is extended or adjusted under 35 U.S.C. 154(b) by 248 days.

(21) Appl. No.: 12/481,160

(22) Filed: Jun. 9, 2009

(65) Prior Publication Data

US 2009/0321640 A1 Dec. 31, 2009

(30) Foreign Application Priority Data

Jun. 27, 2008 (JP) ................................ 2008-168932

(51) Int. Cl.
*G01J 1/44* (2006.01)
(52) U.S. Cl. .................. 250/214 AL; 345/207; 356/425
(58) Field of Classification Search ............ 250/214 AL; 345/207; 356/425
See application file for complete search history.

(56) References Cited

U.S. PATENT DOCUMENTS

| 4,281,337 A * | 7/1981 | Nakamura ................. 348/227.1 |
| 4,677,289 A * | 6/1987 | Nozaki et al. ................. 250/226 |
| 4,902,887 A * | 2/1990 | Everett, Jr. ..................... 250/221 |
| 2006/0146330 A1* | 7/2006 | Maniam ........................ 356/405 |
| 2007/0188441 A1* | 8/2007 | Tanaka et al. ................. 345/102 |
| 2008/0191298 A1* | 8/2008 | Lin et al. ........................ 257/432 |
| 2008/0291455 A1* | 11/2008 | Holland ........................ 356/445 |

FOREIGN PATENT DOCUMENTS

| JP | 61-005613 | 2/1986 |
| JP | 2002-503066 | 1/2002 |
| JP | 2005-184690 | 7/2005 |
| JP | 2006-251806 | 9/2006 |
| JP | A-2007-205902 | 8/2007 |
| WO | 2008/097705 | 8/2008 |

OTHER PUBLICATIONS

Japanese Patent Office, Notification of reasons for refusal issued in connection with Japanese Patent Application No. 2008-168932, dated Jun. 19, 2012. (6 pages).

\* cited by examiner

*Primary Examiner* — Georgia Y Epps
*Assistant Examiner* — Kevin Watt
(74) *Attorney, Agent, or Firm* — K&L Gates LLP

(57) ABSTRACT

An photodetector includes: a first light receiving element that receives light including ambient light; a second light receiving element that receives light including the ambient light; and a red color filter disposed on an optical path through which the ambient light is incident on the second light receiving element.

9 Claims, 11 Drawing Sheets

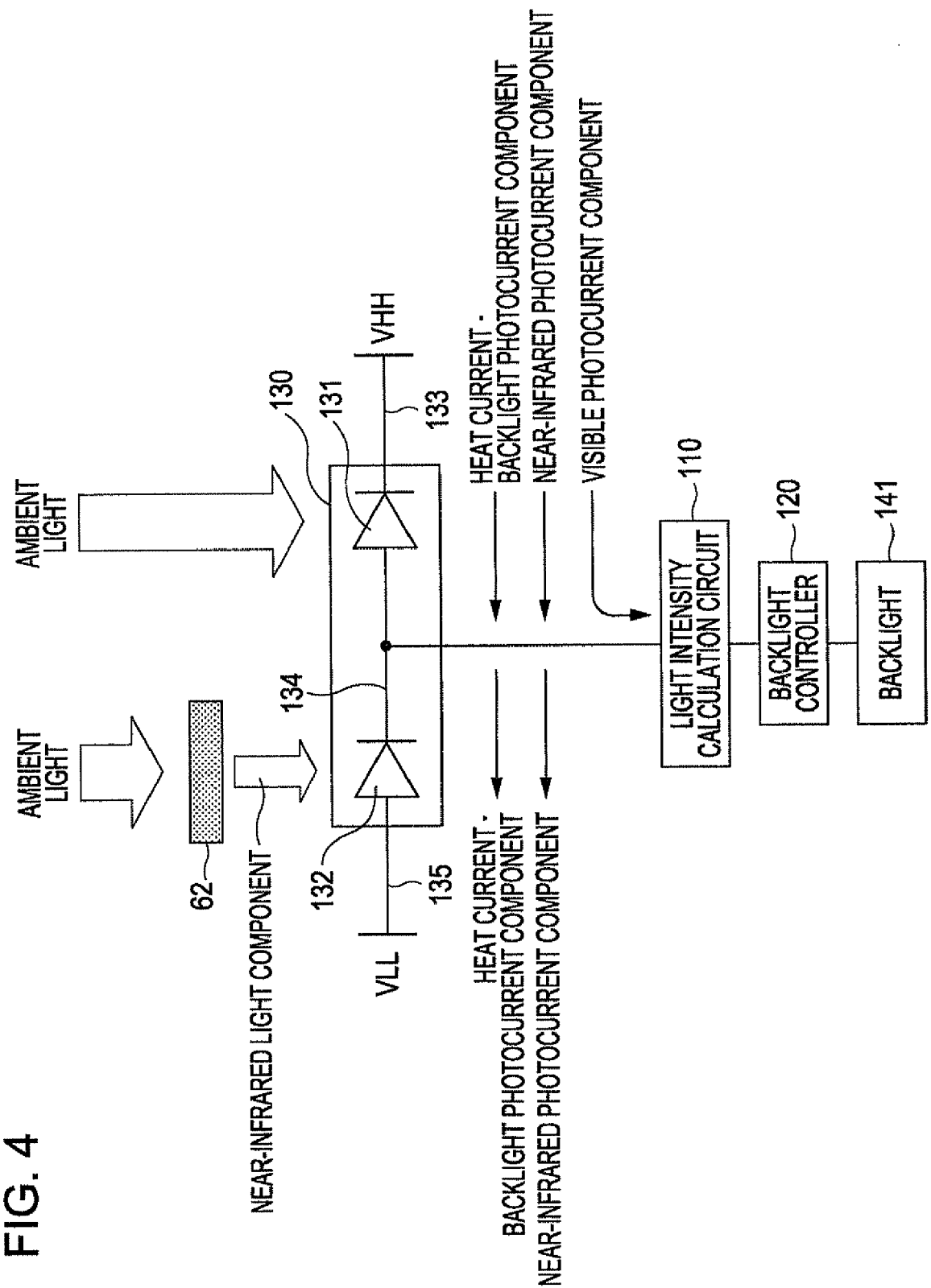

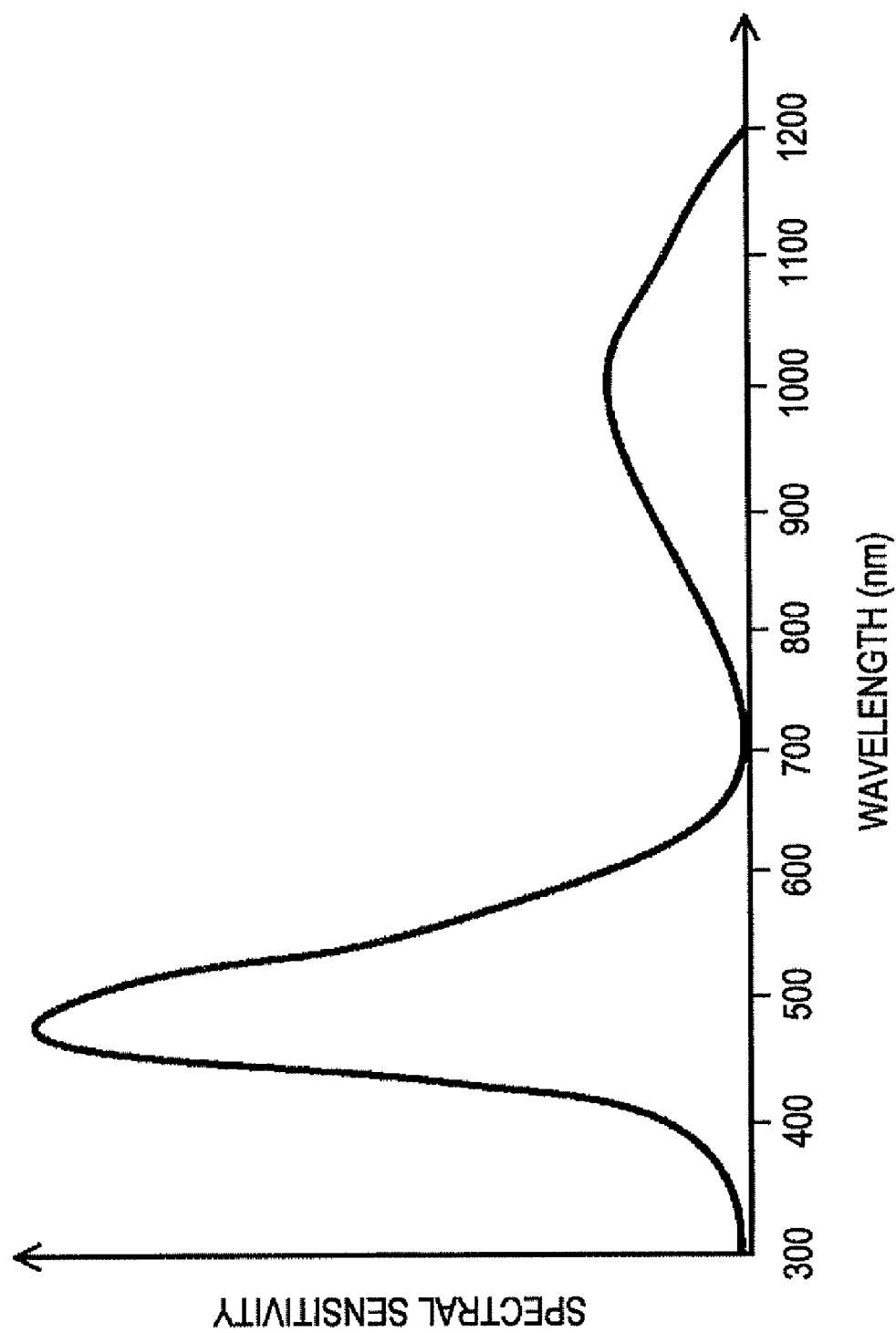

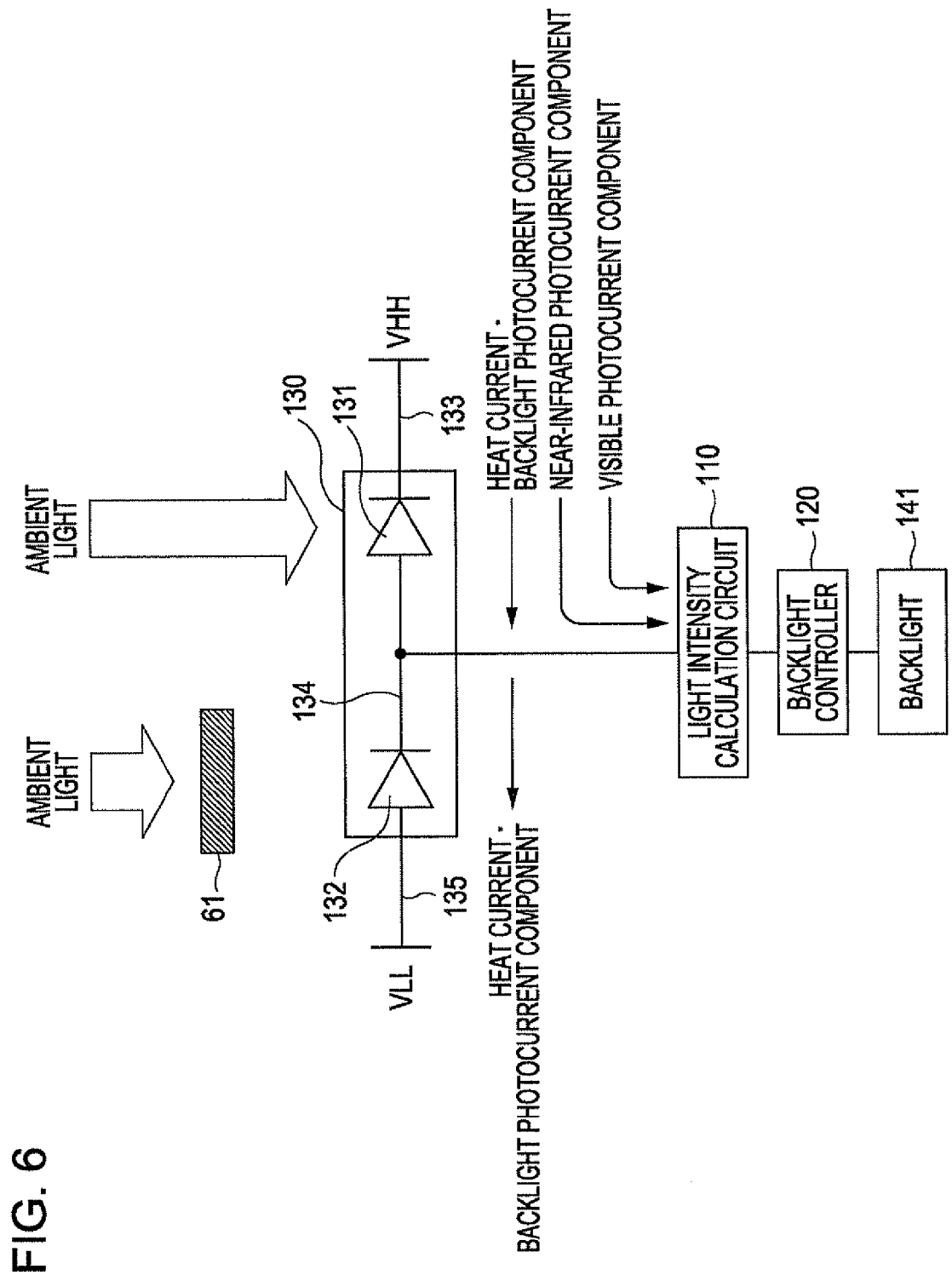

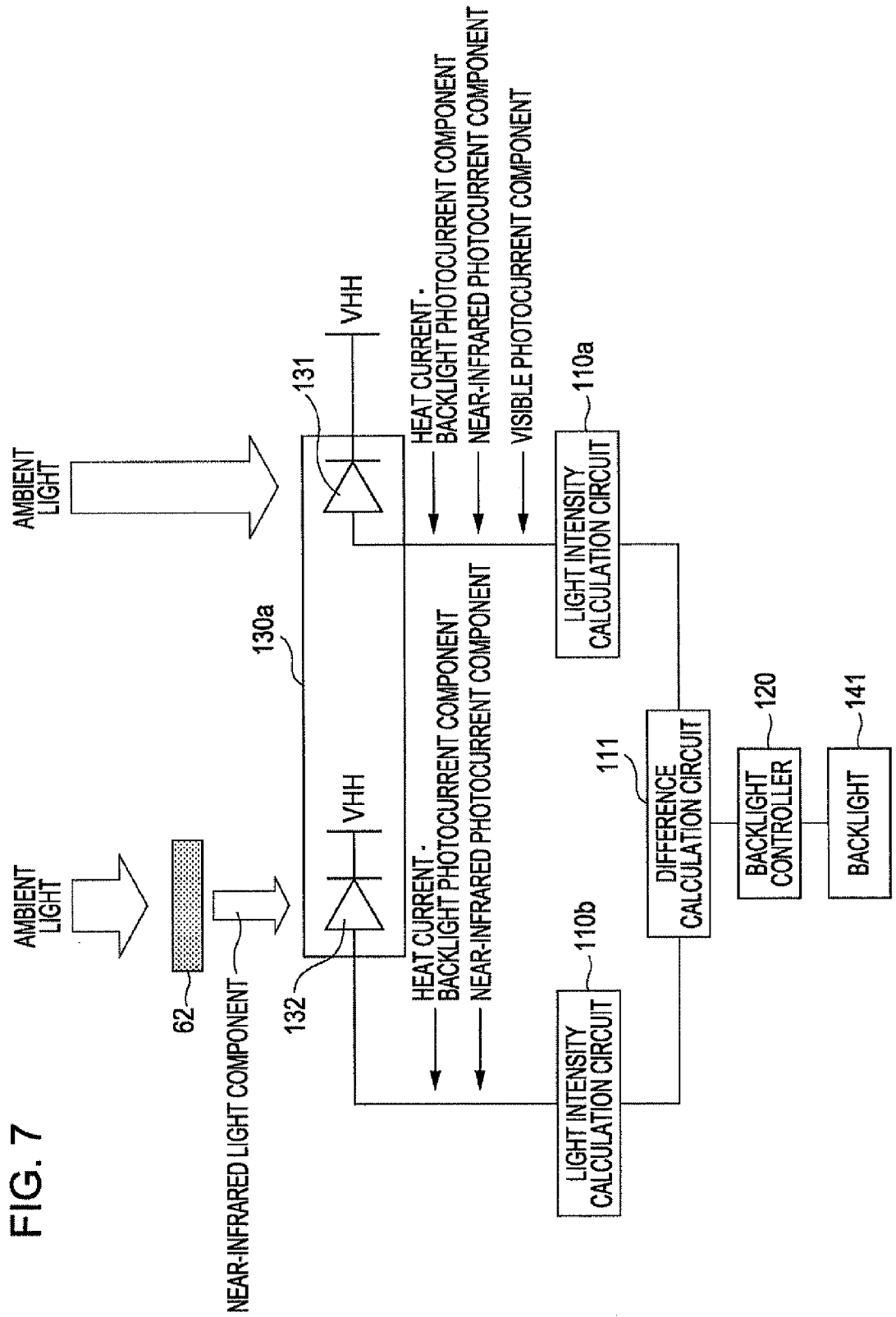

PHOTODETECTOR, ELECTRO-OPTICAL DEVICE, AND ELECTRONIC APPARATUS

BACKGROUND

1. Technical Field

The present invention relates to technical fields of an photodetector including, for example, an optical sensor, an electro-optical device including the photodetector, such as a liquid crystal device, and an electronic apparatus including the electro-optical device.

2. Related Art

An example of an electro-optical device includes a liquid crystal device in which liquid crystal is interposed as an electro-optical material between a pair of substrates. In such a liquid crystal device, gray-scale display is performed, for example, by applying a predetermined voltage to liquid crystal for every pixel portion formed in an image display region in a condition where the liquid crystal is in a predetermined aligned state between the pair of substrates that form a liquid crystal panel, so that the alignment or order of liquid crystal can be changed to modulate light.

It is known that the visibility in such a liquid crystal device changes according to the surrounding brightness (for example, light intensity of ambient light). For example, when the vicinity of a liquid crystal device is relatively bright (for example, when ambient light is relatively strong), it improves the visibility to make the brightness (specifically, brightness of light from a backlight) of the liquid crystal device relatively high. On the other hand, for example, when the vicinity of a liquid crystal device is relatively dark (for example, when ambient light is relatively weak), the visibility does not get worse even if the brightness of the liquid crystal device is not bright more than needed. In order to realize such a configuration, JP-A-2007-205902 discloses an optical sensor including a first photodiode to which ambient light or light from a backlight is irradiated and a second photodiode from which only the ambient light is shielded. In the optical sensor, the first photodiode and the second photodiode are connected in series. Accordingly, a difference between an output of the first photodiode and an output of the second photodiode can be output. As a result, it is possible to output a received photocurrent (that is, a received photocurrent based on only ambient light) in which influences of light from the backlight and temperature characteristics of photodiodes themselves (for example, a backlight photocurrent generated when receiving light from the backlight and a heat current changing with the environmental temperature) are eliminated.

Here, in order to detect the light intensity of ambient light with high precision, it is preferable to bring a spectral sensitivity characteristic of a photodiode close to the relative luminosity characteristic that is the sensitivity of human eyes. However, the spectral sensitivity characteristic of a photodiode may be different from the relative luminosity characteristic that is the sensitivity of human eyes. For example, when a PIN diode manufactured by a low temperature poly silicon process is used as the optical sensor, the PIN (P Intrinsic N) diode has sensitivity not only to a visible light component but also to a near-infrared light component (specifically, a light component having a wavelength of about 700 nm to 1200 nm). For this reason, in the optical sensor including the first photodiode to which ambient light or light from the backlight is irradiated and the second photodiode from which only the ambient light is shielded, not only a received photocurrent based on a visible light component of the ambient light but also a received photocurrent based on a near-infrared light component not sensed by human eyes is output from the optical sensor. Accordingly, for example, even in a situation where it is sensed that the surrounding environment (that is, ambient light) is 'dark' by human eyes, it is determined that the ambient light is relatively bright as much as the output of the received photocurrent based on the near-infrared light component of the ambient light. As a result, a technical problem that the brightness of a display device cannot be suitably adjusted occurs.

SUMMARY

An advantage of some aspects of the invention is that it provides an photodetector capable of suitably detecting the light intensity of ambient light around an electro-optical device, for example, an electro-optical device, and an electronic apparatus.

(Photodetector)

According to an aspect of the invention, an photodetector includes: a first light receiving element that receives light including ambient light; a second light receiving element that receives light including the ambient light; and a red color filter disposed on an optical path through which the ambient light is incident on the second light receiving element.

In the photodetector according to the aspect of the invention, light including ambient light (for example, light from the outside of an electro-optical device including the photodetector; for example, outdoor light such as sunlight) is received by each of the first and second light receiving elements. In this case, it is preferable that the first and second light receiving elements be connected in series. In addition, it is preferable that an input terminal of a detection circuit, which will be described later, be electrically connected to between the first and second light receiving elements. That is, it is preferable that a difference between a light receiving result in the first light receiving element and a light receiving result in the second light receiving element be output to the detection circuit to be described later.

Particularly in the photodetector according to the aspect of the invention, the red color filter is provided on the optical path through which the ambient light is incident on the second light receiving element. The red color filter is a filter that transmits mainly a red light component and a light component (for example, a near-infrared light component having a wavelength of about 700 nm or more) having a wavelength equal to or larger than that of the red light component and cuts off a light component (for example, a visible light component) having a wavelength equal to or smaller than that of the red light component. For example, a red color filter used to realize color display in a typical electro-optical device may be used as the above red color filter.

Therefore, ambient light transmitted through the red color filter and light (for example, light from the backlight), which is not transmitted (or which is transmitted) through the red color filter, other than the ambient light are incident on the second light receiving element. On the other hand, on the optical path through which the ambient light is incident on the first light receiving element, the red color filter that mainly transmits red light therethrough is not provided. Therefore, ambient light (that is, pure ambient light) which is not transmitted through the red color filter and light which is not transmitted (or which is transmitted) through the red color filter, other than the ambient light are incident on the first light receiving element.

For this reason, in the first light receiving element, a heat current corresponding to the environmental temperature of the first light receiving element, a received photocurrent generated when receiving light other than ambient light, a received photocurrent generated when receiving a visible light component of ambient light, and a received photocurrent generated when receiving a near-infrared light component of ambient light are generated. On the other hand, in the second light receiving element, a heat current corresponding to the environmental temperature of the second light receiving element, a received photocurrent generated when receiving light other than ambient light, and a received photocurrent generated when receiving a near-infrared light component of ambient light are generated. As a result, a 'received photocurrent generated when receiving a visible light component of ambient light', which is a difference between the light receiving result (that is, the heat current corresponding to the environmental temperature of the first light receiving element, the received photocurrent generated when receiving light other than ambient light, the received photocurrent generated when receiving a visible light component of ambient light, and the received photocurrent generated when receiving a near-infrared light component of ambient light) in the first light receiving element and the light receiving result (that is, the heat current corresponding to the environmental temperature of the second light receiving element, the received photocurrent generated when receiving light other than ambient light, and the received photocurrent generated when receiving a near-infrared light component of ambient light) in the second light receiving element, is output to the detection circuit to be described later.

Therefore, in the photodetector according to the aspect of the invention, it is possible to output the received photocurrent in which not only influences of light from the backlight and temperature characteristics of photodiodes themselves but also an influence of a near-infrared light component (specifically, a near-infrared light component of ambient light) not sensed by human eyes is eliminated. In other words, also in a case where each of the first and second light receiving elements has sensitivity to the near-infrared light component, the photodetector according to the aspect of the invention can output the received photocurrent in which the influence of the near-infrared light component not sensed by human eyes is eliminated. That is, also in the case where each of the first and second light receiving elements has a spectral sensitivity effective in the relative luminous wavelength band of human eyes but the spectral sensitivity characteristic of each of the first and second light receiving elements is different from the relative luminosity characteristic of human eyes, the spectral sensitivity characteristic as the whole photodetector can be brought relatively close to the relative luminosity characteristic of human eyes. For example, in a situation where it is sensed that the surrounding environment (that is, ambient light) is 'dark' by human eyes, a received photocurrent indicating that the ambient light is relatively dark can be output. In addition, in a situation where it is sensed that the surrounding environment (that is, ambient light) is relatively 'bright' by human eyes, a received photocurrent indicating that the ambient light is relatively bright can be output. Therefore, in the photodetector according to the aspect of the invention, the light intensity of surrounding ambient light can be suitably detected.

In addition, since the red color filter is used, the configuration of the above-described photodetector can be realized without adding a special manufacturing process or using a special material. As a result, the above-described photodetector can be realized relatively easily or cheaply.

Moreover, the situation where each of the first and second light receiving elements has sensitivity to the near-infrared light component is noticeable in the case where optical sensors (for example, PIN diodes or MOS transistors) formed by the low temperature poly silicon process are used as the first and second light receiving elements. Therefore, the photodetector according to the aspect of the invention is effective particularly in the case where optical sensors formed by the low temperature poly silicon process are used as the first and second light receiving elements.

In the photodetector according to the aspect of the invention, it may be possible to further include a first green color filter disposed on an optical path through which the ambient light is incident on the first light receiving element.

In this case, ambient light transmitted through the first green color filter and light, which is not transmitted (or which is transmitted) through at least one of the red color filter and the first green color filter, other than the ambient light are incident on the first light receiving element. Accordingly, a 'received photocurrent generated when receiving a visible light component of ambient light (in particular, a visible light component of ambient light corresponding to the relative luminosity characteristic of human eyes which is obtained when the ambient light is transmitted through the green color filter)', which is a difference between a light receiving result in the first light receiving element and a light receiving result in the second light receiving element, is output to the detection circuit to be described later. For this reason, also in the case where each of the first and second light receiving elements has a spectral sensitivity effective in the relative luminous wavelength band of human eyes but the spectral sensitivity characteristic of each of the first and second light receiving elements is different from the relative luminosity characteristic of human eyes, the spectral sensitivity characteristic as the whole photodetector (in particular, the spectral sensitivity characteristic of the whole photodetector with respect to the ambient light) can be brought relatively close to the relative luminosity characteristic of human eyes. As a result, the light intensity of surrounding ambient light can be detected more suitably.

In addition, the first green color filter is a filter that mainly transmits a green light component. For example, a green color filter used to realize color display in a typical electro-optical device may be used as the above first green color filter. Thus, the configuration of the above-described photodetector can be realized without adding a special manufacturing process or using a special material. As a result, the above-described photodetector can be realized relatively easily or cheaply.

In the above-described photodetector including the first green color filter, it may be possible to further include a second green color filter disposed on the optical path through which the ambient light is incident on the second light receiving element.

In this case, it becomes possible to detect, as a difference between detection results of the first and second light receiving elements, a visible light component of about 500 nm to 700 nm, which could not be detected as the difference between the detection results of the first and second light receiving elements in the case where only the red color filter is disposed on the optical path through which the ambient light is incident on the second light receiving element. Accordingly, the light intensity of surrounding ambient light can be detected more suitably. For example, the transmittance of a color filter for visible light having a wavelength around 560 nm is about 40% in the case of the green color filter and about 20% in the case of the red color filter. Therefore, in the second light receiving element, about 8% of light is eventually received since the visible light having a wavelength around 560 nm is transmitted through the green color filter and the red color filter. On the other hand, in the first light receiving element, about 40% of light, which corresponds to the transmittance of the first green color filter, of the visible light having a wavelength around 560 nm is received. Accordingly, for the visible light having a wavelength around 560 nm, a difference occurs between the light receiving result in the first light receiving element and the light receiving result in the second light receiving element. In this case, since it becomes possible to detect a portion corresponding to the difference as an ambient light component, the light intensity of surrounding ambient light can be detected more suitably.

In addition, the second green color filter is a filter that mainly transmits a green light component. For example, a green color filter used to realize color display in a typical electro-optical device may be used as the above second green color filter. Thus, the configuration of the above-described photodetector can be realized without adding a special manufacturing process or using a special material. As a result, the above-described photodetector can be realized relatively easily or cheaply.

In the above-described photodetector including the second green color filter, the second green color filter may be configured to be located before the red color filter when viewed from a side where the ambient light is incident on the second light receiving element.

In this configuration, the appearance (in particular, the appearance of a portion where each of the first and second light receiving elements is disposed) of the photodetector can be matched with the appearance of the green color filter.

In the photodetector according to the aspect of the invention, it may be possible to further include a detection circuit that detects a visible light component of the ambient light on the basis of a difference between a light receiving result in the first light receiving element and a light receiving result in the second light receiving element.

In this case, the visible light component (for example, the light intensity of a visible light component) of ambient light can be detected with high precision on the basis of the 'received photocurrent generated when receiving a visible light component of ambient light', which is the difference between the light receiving result in the first light receiving element and the light receiving result in the second light receiving element.

According to another aspect of the invention, an photodetector includes: first and second light receiving elements each of which receives light including ambient light and has a light receiving sensitivity to at least a visible light component of the ambient light; a detection circuit that detects a visible light component of the ambient light on the basis of a difference between a light receiving result in the first light receiving element and a light receiving result in the second light receiving element; and a filter that is disposed in an optical path through which the ambient light is incident on the second light receiving element and that cuts off the visible light component and transmits a near-infrared light component. Each of the first and second light receiving elements is formed on a substrate by a low temperature poly silicon process.

The photodetector according to the aspect of the invention can output a received photocurrent in which an influence of a near-infrared light component not sensed by human eyes is eliminated. In other words, also in a case where each of the first and second light receiving elements has sensitivity to the near-infrared light component, the photodetector according to the aspect of the invention can output the received photocurrent in which the influence of the near-infrared light component not sensed by human eyes is eliminated. That is, also in the case where each of the first and second light receiving elements has a spectral sensitivity effective in the relative luminous wavelength band of human eyes but the spectral sensitivity characteristic of each of the first and second light receiving elements is different from the relative luminosity characteristic of human eyes, the spectral sensitivity characteristic as the whole photodetector can be brought relatively close to the relative luminosity characteristic of human eyes. For example, in a situation where it is sensed that the surrounding environment (that is, ambient light) is 'dark' by human eyes, a received photocurrent indicating that the ambient light is relatively dark can be output. In addition, in a situation where it is sensed that the surrounding environment (that is, ambient light) is relatively 'bright' by human eyes, a received photocurrent indicating that the ambient light is relatively bright can be output. Therefore, in the photodetector according to the aspect of the invention, the light intensity of surrounding ambient light can be suitably detected.

Furthermore, by forming the first and second light receiving elements on the substrate by the low temperature poly silicon process, the visible light component can be cut off even if the light receiving element has sensitivity not only to the visible light component but to the near-infrared light component. Moreover, the light intensity of surrounding ambient light can be suitably detected by disposing a filter, which transmits the near-infrared light component therethrough, on the optical path of the second light receiving element (Electro-Optical Device)

In order to solve the above-described problems, according to still another aspect of the invention, an electro-optical device includes the photodetector (various forms thereof are also included) according to the aspect of the invention.

In the electro-optical device according to the aspect of the invention, the same effects as the various effects obtained by the above-described photodetector according to the aspect of the invention can also be obtained.

In addition, the electro-optical device according to the aspect of the invention may also have various forms corresponding to the various forms of the photodetector according to the aspect of the invention. Examples of such an electro-optical device include an organic EL device, a plasma display device, and an electrophoretic device such as electronic paper.

In the electro-optical device according to the aspect of the invention, it may be possible to further include: a light source that supplies light to the electro-optical device; and an adjustment circuit that controls an amount of light of the light source on the basis of a difference between a light receiving result in the first light receiving element and a light receiving result in the second light receiving element.

In this case, the amount of light of the light source (in other words, brightness of the electro-optical device) can be suitably adjusted on the basis of the visible light component of the ambient light detected with high precision by the photodetector described above.

(Electronic Apparatus)

In order to solve the above-described problems, according to still another aspect of the invention, an electronic apparatus includes the electro-optical device (various forms thereof are also included) according to the aspect of the invention.

Since the electronic apparatus according to the aspect of the invention includes the above-described electro-optical device (or various forms thereof) according to the aspect of the invention, the same effects as the various effects obtained by the above-described electro-optical device according to the aspect of the invention can also be obtained. That is, various electronic apparatuses, such as a projection-type display device, a television, a portable phone, an electronic organizer, a portable audio player, a word processor, a digital camera, a view-finder-type or monitor-direct-view-type video tape recorder, a work station, a video phone, a POS terminal, and a touch panel, which are capable of obtaining the same effects as the various effects obtained by the above-described electro-optical device according to the aspect of the invention can be realized for the above reason.

The effects and other advantages of the invention will be apparent from embodiments described below.

BRIEF DESCRIPTION OF THE DRAWINGS

The invention will be described with reference to the accompanying drawings, wherein like numbers reference like elements.

FIG. 4 is a block diagram conceptually illustrating the surrounding configuration of the optical sensor.

FIGS. 5A and 5B are graphs illustrating a filter characteristic of a red color filter and a spectral sensitivity characteristic of a photodiode (that is, a PIN diode formed by a low temperature poly silicon process) according to the embodiment.

FIG. 6 is a block diagram conceptually illustrating the surrounding configuration of an optical sensor provided in a liquid crystal device in a comparative example.

FIG. 7 is a block diagram conceptually illustrating another surrounding configuration of the optical sensor.

DESCRIPTION OF EXEMPLARY EMBODIMENTS

Hereinafter, preferred embodiments of the invention will be described with reference to the accompanying drawings. In addition, the following explanation will be made using a liquid crystal device as an example of an electro-optical device according to an embodiment of the invention.

(1) Basic Configuration of a Liquid Crystal Device

Figure 1:
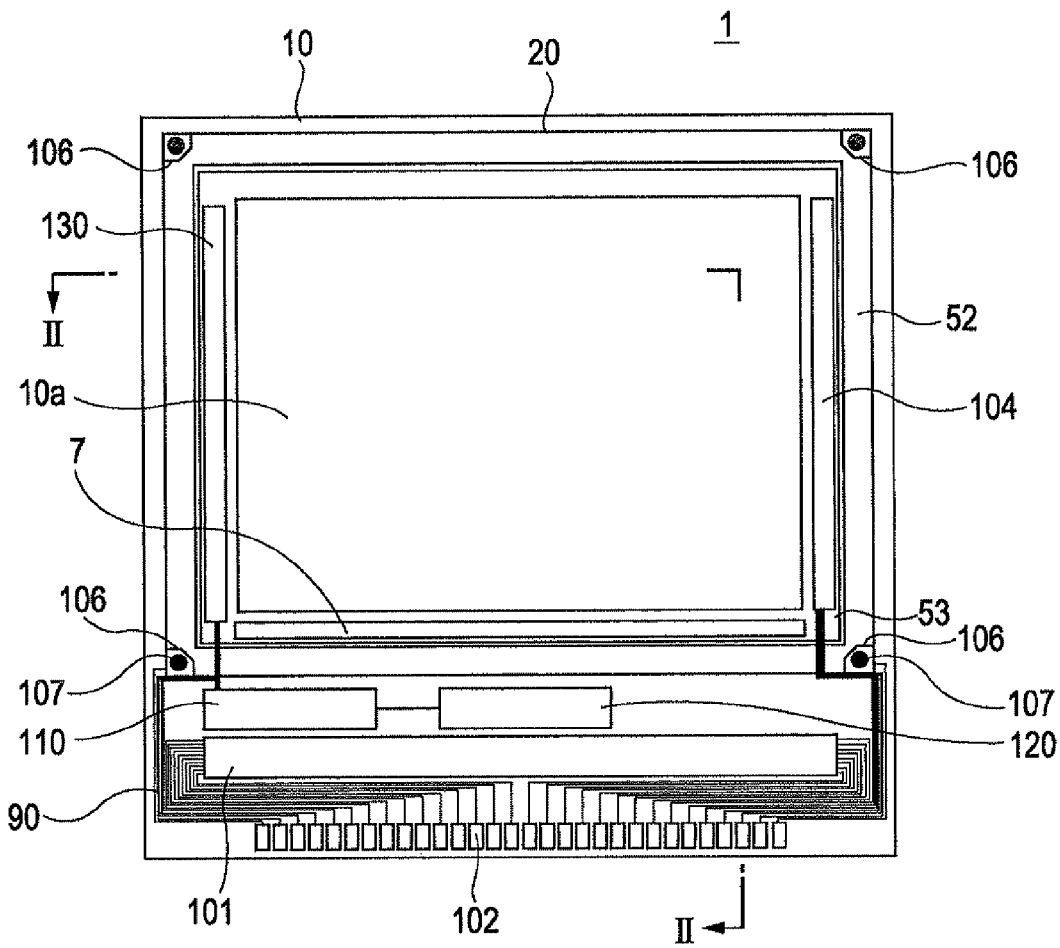
FIG. 1 is a plan view illustrating the configuration of a liquid crystal device according to an embodiment.

First, the configuration of a liquid crystal device according to the present embodiment will be described with reference to FIGS. 1 and 2. FIG. 1 is a plan view illustrating the configuration of the liquid crystal device according to the present embodiment, and FIG. 2 is a cross-sectional view taken along the line II-II of FIG. 1.

Figure 2:
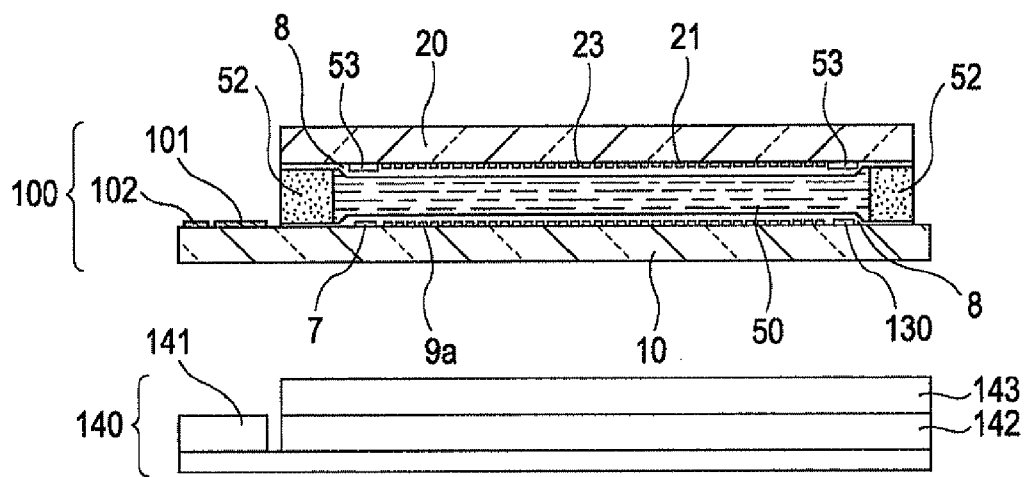
FIG. 2 is a cross-sectional view taken along the line II-II of FIG. 1.

Referring to FIGS. 1 and 2, a TFT array substrate 10 and a counter substrate 20 are arrayed to face each other in a liquid crystal device 1 according to the present embodiment. A liquid crystal panel 100 is formed by interposing a liquid crystal layer 50 between the TFT array substrate 10 and the counter substrate 20. In addition, the TFT array substrate 10 and the counter substrate 20 are bonded to each other by sealant 52 provided in a frame-shaped sealing region located around an image display region 10a.

Referring to FIG. 1, a frame-shaped light-shielding layer 53 which defines a frame region of the image display region 10a is provided on a side of the counter substrate 20 in parallel with an inner side of the sealing region where the sealant 52 is disposed. A data line driving circuit 101 and an external circuit connecting terminal 102 are provided along one side of the TFT array substrate 10 in a peripheral region which is located outside the sealing region where the sealant 52 is arranged. In this case, the data line driving circuit 101 may be provided at the more inner side than the sealing region such that the data line driving circuit 101 is covered by the frame-shaped light-shielding layer 53. At the more inner side than the sealing region along the one side, a sampling circuit 7 is provided to be covered by the frame-shaped light-shielding layer 53. In addition, at the more inner side than the sealing region along two sides adjacent to the one side, scanning line driving circuits 104 are provided to be covered by the frame-shaped light-shielding layer 53. Moreover, on the TFT array substrate 10, vertical electrical connection terminals 106 used to make a connection between both the substrates through a vertical electrical connection material 107 are disposed in regions facing four corners of the counter substrate 20. Thus, the TFT array substrate 10 and the counter substrate 20 can be electrically conducted to each other.

Furthermore, at the more inner side than the sealing region, an optical sensor 130 as a specific example of an 'photodetector' in the invention is provided to be covered by the frame-shaped light-shielding layer 53. Accordingly, in a place of the frame-shaped light-shielding layer 53 where the optical sensor 130 is provided, ambient light can be transmitted through the optical sensor 130. In addition, the detailed configuration of the optical sensor 130 will be described later (refer to FIG. 3).

On the TFT array substrate 10, lead wiring lines 90 for electrically connecting the external circuit connecting terminal 102, the data line driving circuit 101, the scanning line driving circuits 104, the vertical electrical connection terminals 106, and the like are formed.

In addition, a light intensity calculation circuit 110, which calculates the light intensity of ambient light on the basis of an output of the optical sensor 130 and serves as a specific example of a 'detection circuit' in the invention, and a backlight controller 120, which adjusts the brightness of a backlight 141 on the basis of the light intensity of the ambient light calculated in the light intensity calculation circuit 110 and serves as a specific example of an 'adjustment circuit' in the invention, are formed on the TFT array substrate 10.

Referring to FIG. 2, a laminated structure in which pixel switching TFTs (thin film transistors) serving as driving elements and wiring lines, such as scanning lines and data lines, are made is formed on the TFT array substrate 10. In the image display region 10a, pixel electrodes 9a are provided in a matrix on an upper layer of the pixel switching TFTs and the wiring lines, such as scanning lines and data lines. An alignment layer 8 is formed on the pixel electrodes 9a. On the other hand, a light-shielding layer 23 is formed on a surface of the counter substrate 20 facing the TFT array substrate 10. For example, the light-shielding layer 23 is formed of a metal film with a light-shielding property and is patterned in a lattice shape within the image display region 10a on the counter substrate 20. In addition, on the light-shielding layer 23, a counter electrode 21 formed of a transparent material, such as an ITO, is formed in a solid state so as to face the plurality of pixel electrodes 9a. The alignment layer 8 is formed on the counter electrode 21. In addition, the liquid crystal layer 50 is formed of, for example, liquid crystal in which one or several kinds of nematic liquid crystal are mixed, and has a predetermined aligned state between the pair of alignment layers.

In addition, although not shown herein, a test circuit, a test pattern, and the like for testing the quality, defects, and the like of the liquid crystal device during manufacture or at the time of shipment may be formed on the TFT array substrate 10, in addition to the data line driving circuit 101 and the scanning line driving circuits 104.

In addition, the liquid crystal device 1 may be configured to perform transmissive display by forming the pixel electrode 9a with an ITO or the like. Alternatively, the liquid crystal device 1 may be configured to have both a reflective region and a transmissive region provided in the pixel electrode 9a by forming the pixel electrode 9a with aluminum or the like and disposing a reflective layer behind the pixel electrode 9a so that transflective display is performed. Moreover, in the present embodiment, as described above, it is preferable that the liquid crystal device 1 be of a direct view type in which the backlight 141 is suitably disposed behind the liquid crystal panel seen from a viewer.

For this reason, the liquid crystal device 1 according to the present embodiment includes a backlight module 140. The backlight module 140 emits light from a lower side of the TFT array substrate 10. In the liquid crystal device 1, an image is displayed by controlling the transmittance of light emitted from the backlight 140 according to an image signal in the image display region 10a.

The backlight module 140 includes the backlight 141 formed by light-emitting diodes, which are one or a plurality of point light sources included in a light source. A light guiding plate 142 is provided to be located beside the backlight 141 and at a lower side of the image display region 10a of the liquid crystal panel 100. The backlight 141 is disposed to face a side surface of the light guiding plate 142, so that the backlight 141 can emit light into the light guiding plate 142.

The light guiding plate 142 has an approximately plate shape and is disposed such that one side surface (incidence surface) thereof faces an emission surface of the backlight 141. The light guiding plate 142 is formed of a transparent acrylic resin, for example. Reflective layers formed of a material (for example, a white printed layer) having a reflection property or a scattering property, for example, are formed on three side surfaces other than the one side surface facing the backlight 141. Light emitted from the backlight 141 is incident on the one side surface of the light guiding plate 142 facing the backlight 141 to be then guided to the inside of the light guiding plate 142.

Moreover, in addition to the acrylic resin, various resins, such as a transparent or transmissive polycarbonate resin and an amorphous polyolefin resin, inorganic materials such as glass, and a complex thereof may be used as materials of the light guiding plate 142.

The light guiding plate 142 is configured such that incident light is reflected and scattered by the reflective layers on the bottom and side surfaces and the light is emitted from the upper surface. An optical sheet 143 including a diffusion sheet, a prism sheet, and the like is formed on the upper surface of the light guiding plate 142. The optical sheet 143 is formed on the light guiding plate 142 such that the image display region 10a is disposed on the optical sheet 143. In addition, since the optical sheet 143 diffuses light from the light guiding plate 142 to be emitted upward, the light from the optical sheet 143 is incident on the image display region 10a.

(2) Configuration of an Optical Sensor

Subsequently, the more detailed configuration of the optical sensor 130 will be described with reference to FIGS. 3 and 4. Here, FIG. 3 is a cross-sectional view conceptually illustrating the more detailed configuration of the optical sensor 130, and FIG. 4 is a block diagram conceptually illustrating the surrounding configuration of the optical sensor 130.

Figure 3:
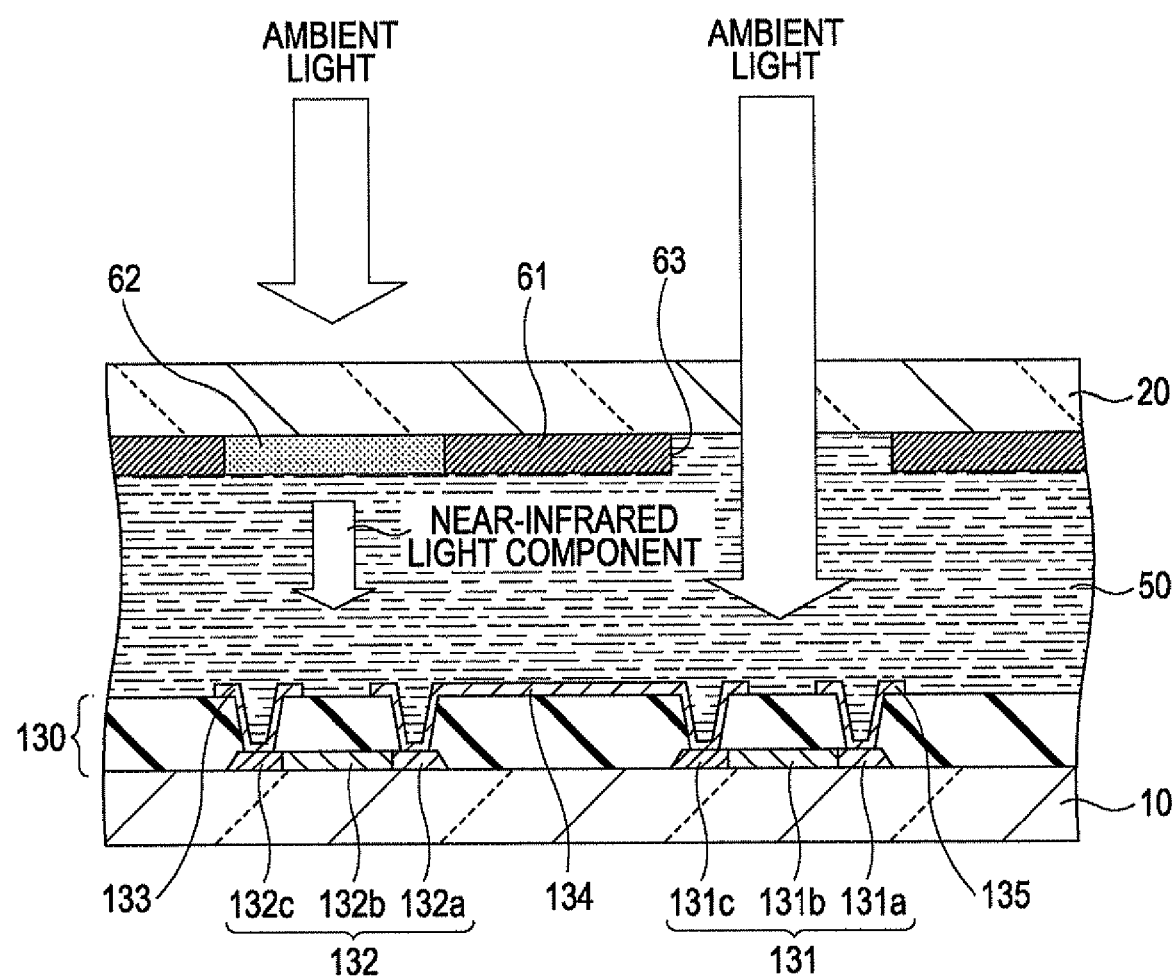
FIG. 3 is a cross-sectional view conceptually illustrating the more specific configuration of an optical sensor.

As shown in FIGS. 3 and 4, the optical sensor 130 is formed on the TFT array substrate 10 by an SOG (system on glass) technique and includes a photodiode 131 as a specific example of a 'first light receiving element' in the invention and a photodiode 132 as a specific example of a 'second light receiving element' in the invention.

The photodiode 131 is a PIN diode in which a P-type semiconductor layer 131a, a semiconductor layer 131b, and an N-type semiconductor layer 131c are bonded in this order. In addition, the photodiode 132 is a PIN diode in which a P-type semiconductor layer 132a, a semiconductor layer 132b, and an N-type semiconductor layer 132c are bonded in this order. The P-type semiconductor layer 131a of the photodiode 131 is electrically connected to a high-potential power supply VHH through a wiring line 135, the N-type semiconductor layer 131c of the photodiode 131 is electrically connected to the P-type semiconductor layer 132a of the photodiode 132 through a wiring line 134, and the N-type semiconductor layer 132c of the photodiode 132 is electrically connected to a low-potential power supply VLL through a wiring line 133. That is, in the present embodiment, the photodiode 131 and the photodiode 132 are connected in series. In addition, it is preferable that each of the photodiode 131 and the photodiode 132 be formed on the TFT substrate 10 using a low temperature poly silicon process.

Between the photodiode 131 and the photodiode 132 (that is, to the wiring line 134), an input terminal of the light intensity calculation circuit 110 is electrically connected. Accordingly, a difference between a current generated in the photodiode 131 and a current generated in the photodiode 132 is input to the light intensity calculation circuit 110. The light intensity calculation circuit 110 calculates the light intensity of ambient light (more specifically, outdoor light other than light from the backlight), which is incident on the liquid crystal device 1 from the outside, on the basis of the difference between the current generated in the photodiode 131 and the current generated in the photodiode 132. The calculated light intensity of the ambient light is output to the backlight controller 120.

The backlight controller 120 adjusts the brightness of the backlight 141 on the basis of the light intensity of the ambient light calculated by the light intensity calculation circuit 110.

Particularly in the present embodiment, an opening 63 opened to the outside of the liquid crystal device 1 is provided in a region portion of the counter substrate 20 facing the photodiode 131. On the other hand, a red color filter 62 is provided in a region portion of the counter substrate 20 facing the photodiode 132. In addition, a black matrix 61 (that is, the frame-shaped light-shielding layer 53) that shields light is provided in a region portion other than the region, in which the red color filter 62 and the opening 63 are provided, of the region portion on the counter substrate 20 facing the optical sensor 130.

Here, referring to FIGS. 5A and 5B, a filter characteristic of the red color filter 62 and spectral sensitivity characteristics of the photodiodes 131 and 132 (that is, PIN diodes formed by the low temperature poly silicon process) according to the present embodiment will be described. Here, FIGS. 5A and 5B are graphs illustrating the filter characteristic of the red color filter 62 and the spectral sensitivity characteristics of the photodiodes 131 and 132 (that is, PIN diodes formed by the low temperature poly silicon process) according to the present embodiment.

Figure 5A:
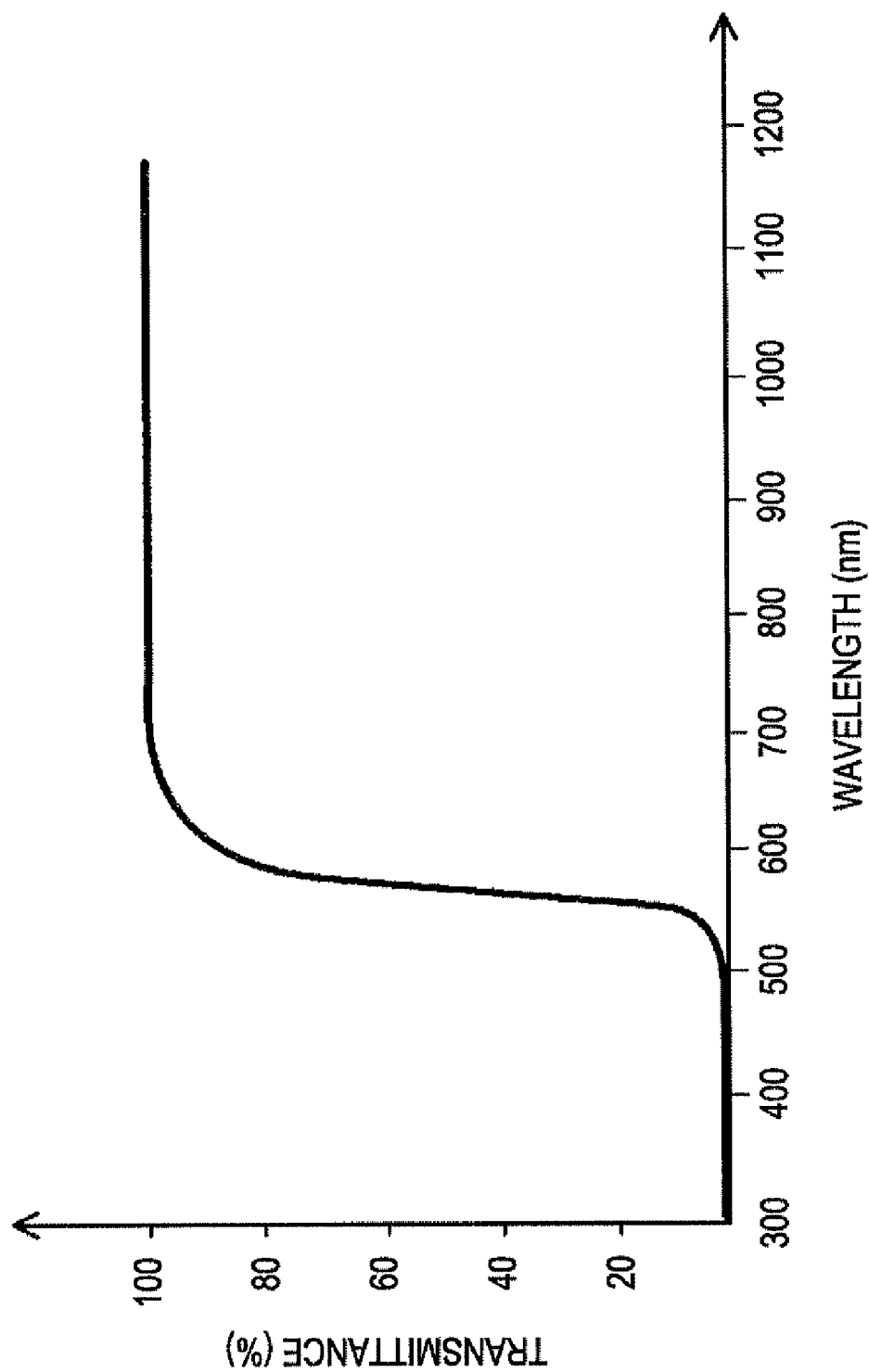

As shown in FIG. 5A, the red color filter 62 has a property of transmitting mainly a red light component and a light component (for example, a near-infrared light component having a wavelength of about 700 nm or more) having a wavelength equal to or larger than that of the red light component and cutting off a light component (for example, a visible light component) having a wavelength equal to or smaller than that of the red light component. More specifically, the red color filter 62 cuts off a light component having a wavelength of about 500 nm or less, transmits a light component having a wavelength of about 500 nm to 700 nm with a transmittance corresponding to the wavelength, and transmits a light component having a wavelength of about 700 nm or more with a transmittance of about 100%.

In addition, as shown in FIG. 5B, each of the photodiodes 131 and 132 according to the present embodiment has a sensitivity characteristic with a wavelength of about 450 nm as the peak and has sensitivity to a light component having a wavelength of about 300 nm to 700 nm. In addition, each of the photodiodes 131 and 132 according to the present embodiment also has a corresponding sensitivity to a light component having a wavelength of about 700 nm to 1200 nm.

Referring back to FIGS. 3 and 4, ambient light transmitted through the red color filter 62 having the filter characteristic shown in FIG. 5A and light (for example, light from the backlight which is not shown) other than the ambient light are incident again on the photodiode 132. Accordingly, a light component (for example, a near-infrared light component), which has a wavelength equal to or larger than the wavelength of infrared light, of the ambient light and light (for example, light from the backlight) other than the ambient light are incident on the photodiode 132. Here, since the photodiode 132 has the spectral sensitivity characteristic shown in FIG. 5B, a heat current changing according to the environmental temperature, a received photocurrent (backlight photocurrent) generated when receiving light other than the ambient light, and a received photocurrent (near-infrared photocurrent component) generated when receiving a near-infrared light component (for example, a light component having a wavelength of about 700 nm to 1200 nm) of ambient light are generated in the photodiode 132.

On the other hand, the ambient light (that is, ambient light that is not transmitted through the red color filter 62 and is pure ambient light) incident through the opening 63 and light (for example, light from the backlight) other than the ambient light are incident on the photodiode 131. Accordingly, a heat current changing according to the environmental temperature around the photodiode 131, a received photocurrent (backlight photocurrent) generated when receiving light other than the ambient light, a received photocurrent (visible photocurrent component) generated when receiving a visible light component (for example, a light component having a wavelength of about 300 nm to 700 nm) of ambient light, and a received photocurrent (near-infrared photocurrent component) generated when receiving a near-infrared light component (for example, a light component having a wavelength of about 700 nm to 1200 nm) of ambient light are generated in the photodiode 131 having the spectral sensitivity characteristic shown in FIG. 5B.

As a result, a 'received photocurrent (that is, a visible photocurrent component) generated when receiving a visible light component of ambient light', which is a difference between a light receiving result (that is, the heat current, the backlight photocurrent, the visible photocurrent component, and the near-infrared photocurrent component) in the photodiode 131 and a light receiving result (that is, the heat current, the backlight photocurrent, and the near-infrared photocurrent component) in the photodiode 132, is output to the light intensity calculation circuit 110.

Here, a comparative example of the liquid crystal device 1 according to the present embodiment will be described with reference to FIG. 6. FIG. 6 is a block diagram conceptually illustrating the surrounding configuration of the optical sensor 130 provided in a liquid crystal device 1a in the comparative example.

As shown in FIG. 6, in the liquid crystal device 1a in the comparative example, the black matrix 61 is provided in a region portion of the counter substrate 20 facing the photodiode 132 instead of the red color filter 62 according to the present embodiment. Accordingly, in the liquid crystal device 1a in the comparative example, ambient light is not incident on the photodiode 132 but only light (for example, light from the backlight) other than the ambient light is incident on the photodiode 132. For this reason, a heat current changing according to the environmental temperature around the photodiode 132 and a received photocurrent (backlight photocurrent) generated when receiving light other than the ambient light are generated in the photodiode 132. As a result, in the liquid crystal device 1a in the comparative example, a 'received photocurrent (that is, a visible photocurrent component) generated when receiving a visible light component of ambient light' and a 'received photocurrent (that is, a near-infrared photocurrent component) generated when receiving a near-infrared light component of ambient light', which are differences between a light receiving result (that is, the heat current, the backlight photocurrent, the visible photocurrent component, and the near-infrared photocurrent component) in the photodiode 131 and a light receiving result (that is, the heat current and the backlight photocurrent) in the photodiode 132 are output to the light intensity calculation circuit 110.

Therefore, in the liquid crystal device 1a in the comparative example, the light intensity calculation circuit 110 calculates the light intensity of ambient light on the basis of the visible photocurrent component and the near-infrared photocurrent component, and the backlight controller 120 adjusts the brightness of the backlight 141 on the basis of the light intensity (that is, light intensity of ambient light including a visible photocurrent component and a near-infrared photocurrent component) of the ambient light calculated by the light intensity calculation circuit 110. However, since a received photocurrent based on a near-infrared light component which is not sensed by human eyes is output from the optical sensor 130 to the light intensity calculation circuit 110, for example, the light intensity of ambient light sensed by human eyes may not match the light intensity of ambient light calculated by the light intensity calculation circuit 120. Specifically, for example, even in a situation where it is sensed that the surrounding environment (that is, ambient light) is 'dark' by human eyes, the intensity of light which is relatively bright as much as the output of a received photocurrent based on the near-infrared light component of ambient light may be calculated. For this reason, in the liquid crystal device 1a in the comparative example, the brightness of the backlight 141 may not be adjusted appropriately.

Therefore, in the liquid crystal device 1 according to the present embodiment, a received photocurrent in which not only influences of light from the backlight and temperature characteristics of the photodiodes 131 and 132 themselves but also an influence of the near-infrared photocurrent component (specifically, the near-infrared photocurrent component of ambient light) not sensed by human eyes is eliminated can be output from the optical sensor 130 to the light intensity calculation circuit 110. In other words, also in a case where each of the photodiodes 131 and 132 has sensitivity to the near-infrared light component, the optical sensor 130 can output to the light intensity calculation circuit 110 the received photocurrent (that is, the visible photocurrent component) in which the influence of the near-infrared light component not sensed by human eyes is eliminated. That is, also in the case where the spectral sensitivity characteristic of each of the photodiodes 131 and 132 is different from the relative luminosity characteristic of human eyes, the spectral sensitivity characteristic as the whole optical sensor 130 can be brought relatively close to the relative luminosity characteristic of human eyes. For example, in a situation where it is sensed that the surrounding environment (that is, ambient light) is 'dark' by human eyes, a received photocurrent indicating that the ambient light is relatively dark can be output from the optical sensor 130 to the light intensity calculation circuit 110. Similarly, in a situation where it is sensed that the surrounding environment (that is, ambient light) is relatively 'bright' by human eyes, a received photocurrent indicating that the ambient light is relatively bright can be output from the optical sensor 130 to the light intensity calculation circuit 110. Therefore, in the liquid crystal device 1 according to the present embodiment, the light intensity of surrounding ambient light can be suitably detected. As a result, the brightness of the backlight 141 can be suitably adjusted.

In addition, in the liquid crystal device 1 according to the present embodiment, the red color filter 62 is used to eliminate the influence of the near-infrared photocurrent component of ambient light. Accordingly, the configuration of the above-described liquid crystal device 1 can be realized without adding a special manufacturing process or using a special material. As a result, the above-described liquid crystal device 1 can be realized relatively easily or cheaply.

Moreover, the situation where each of the photodiodes 131 and 132 has sensitivity to the near-infrared light component is noticeable in the case where PIN diodes formed by the low temperature poly silicon process are used as the photodiodes 131 and 132. Therefore, in the liquid crystal device 1 according to the present embodiment, noticeable effects can be obtained particularly in the case where PIN diodes formed by the low temperature poly silicon process are used as the photodiodes 131 and 132.

In addition, in the above explanation, the example where the photodiodes 131 and 132 are used as PIN diodes is adopted. However, also in the case where diodes (for example, MOS transistors) other than the PIN diodes are used as the photodiodes 131 and 132, the same effects can be obtained by adopting the above-described configuration. In addition, even if other various light receiving elements are used without being limited to the diodes, the same effects can be obtained by adopting the above-described configuration.

Moreover, in the above explanation, a detailed explanation on detailed configurations and detailed operations of the light intensity calculation circuit 110 and backlight controller 120 is omitted for the simplicity of explanation. However, it is needless to say that the arbitrary configurations used for the known liquid crystal device 1 and the like may be adopted as the light intensity calculation circuit 110 and the backlight controller 120. For example, the configuration disclosed in JP-A-2007-205902 may be adopted as an example of each of the light intensity calculation circuit 110 and the backlight controller 120.

Moreover, in the embodiment described above, the liquid crystal panel has a configuration with a vertical electric field, such as TN (twist nematic), ECB (birefringence electric field effect), and VA (vertical alignment). However, the above-described various effects may also be realized in cases of IPS (in-plane switching) and FFS (fringe field switching).

In addition, in the above embodiment, a configuration where the photodiodes 131 and 132 are connected in series, the input terminal of the light intensity calculation circuit 110 is electrically connected between the photodiodes 131 and 132, and the visible light component of ambient light is detected by the light intensity calculation circuit 110 has been described as the configuration where the visible light component of ambient light is detected on the basis of the difference between the light receiving result in the first light receiving element and the light receiving result in the second light receiving element. However, the invention is not limited to the configuration. Another exemplary configuration will be described with reference to FIG. 7. In addition, the same components as in the liquid crystal device 1 are denoted by the same reference numerals, and a detailed explanation thereof will be omitted.

As shown in FIG. 7, the light intensity calculation circuit 110a is connected to the photodiode 131, and the light intensity calculation circuit 110b is connected to the photodiode 132. Accordingly, the sum of a heat current corresponding to the environmental temperature of the photodiode 131, a received photocurrent generated when receiving light (for example, light from the backlight) other than ambient light, a received photocurrent generated when receiving a visible light component of ambient light, and a received photocurrent generated when receiving a near-infrared light component of ambient light is input to the light intensity calculation circuit 110a and the light intensity is calculated on the basis of the input current. On the other hand, the sum of a heat current corresponding to the environmental temperature of the photodiode 132, a received photocurrent generated when receiving light (for example, light from the backlight) other than ambient light, and a received photocurrent generated when receiving a near-infrared light component of ambient light is input to the light intensity calculation circuit 110b and the light intensity is calculated on the basis of the input current. The light intensities calculated in the light intensity calculation circuits 110a and 110b are input to a difference calculation circuit 111. The difference calculation circuit 111 calculates the light intensity of ambient light (more specifically, outdoor light other than light from the backlight), which is incident on the liquid crystal device 1 from the outside, on the basis of a difference between both the light intensities. The calculated light intensity of the ambient light is output to the backlight controller 120. According to this configuration, since the photodiodes 131 and 132 are not connected in series, it is not necessary to consider wiring lines between both the photodiodes 131 and 132 at the time of layout of the photodiodes 131 and 132 on the TFT array substrate. As a result, the layout efficiency is improved.

(3) First Modification

Figure 8:
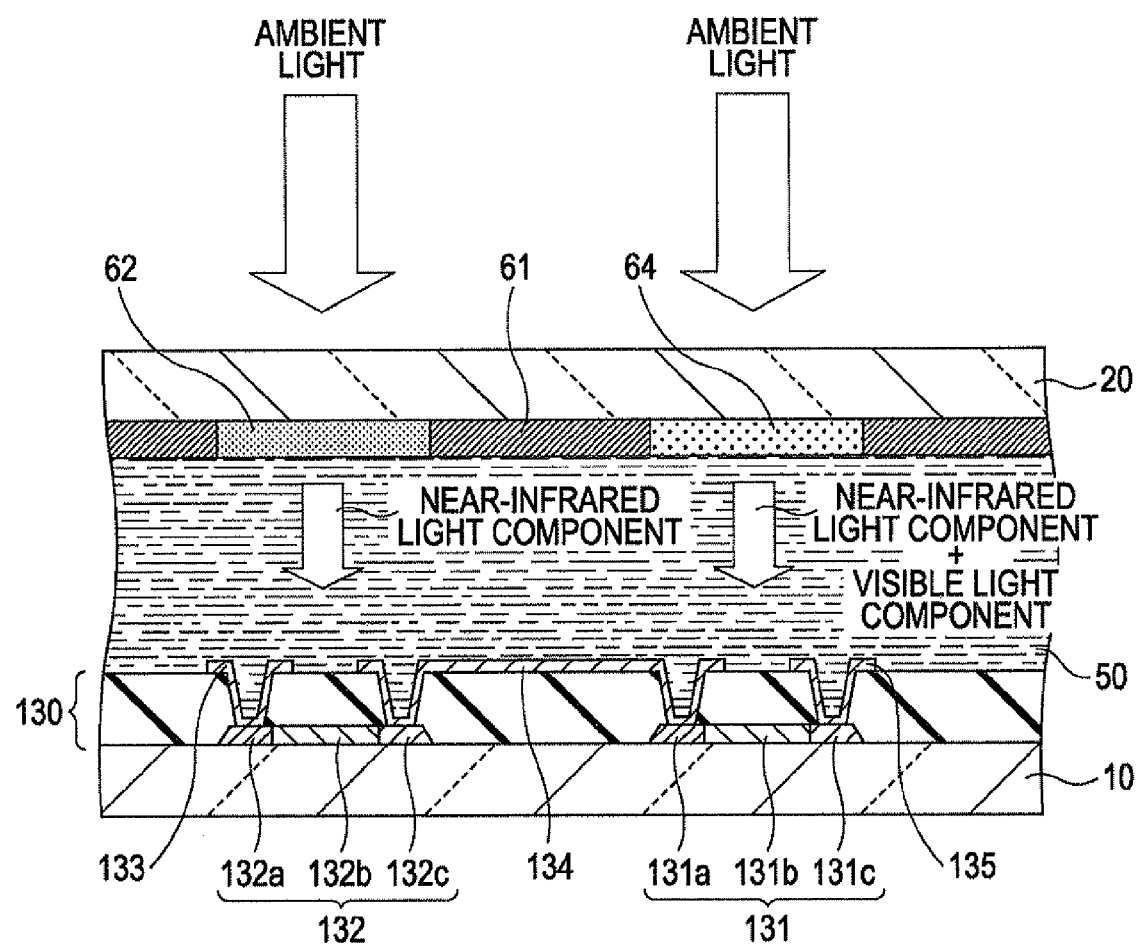
FIG. 8 is a cross-sectional view conceptually illustrating the more specific configuration of an optical sensor of a liquid crystal device in a first modification.

Next, a first modification of the liquid crystal device 1 according to the present embodiment will be described with reference to FIG. 8. Here, FIG. 8 is a cross-sectional view conceptually illustrating the more specific configuration of an optical sensor 130 of a liquid crystal device 2 in the first modification. In addition, the same components as in the liquid crystal device 1 are denoted by the same reference numerals, and a detailed explanation thereof will be omitted.

As shown in FIG. 8, a liquid crystal device 2 in the first modification has approximately the same configuration as the liquid crystal device 1. Particularly in the liquid crystal device 2 in the first modification, a green color filter 64 is provided in a region portion of the counter substrate 20 facing the photodiode 131 instead of the opening 63, compared with the liquid crystal device 1.

Figure 9:
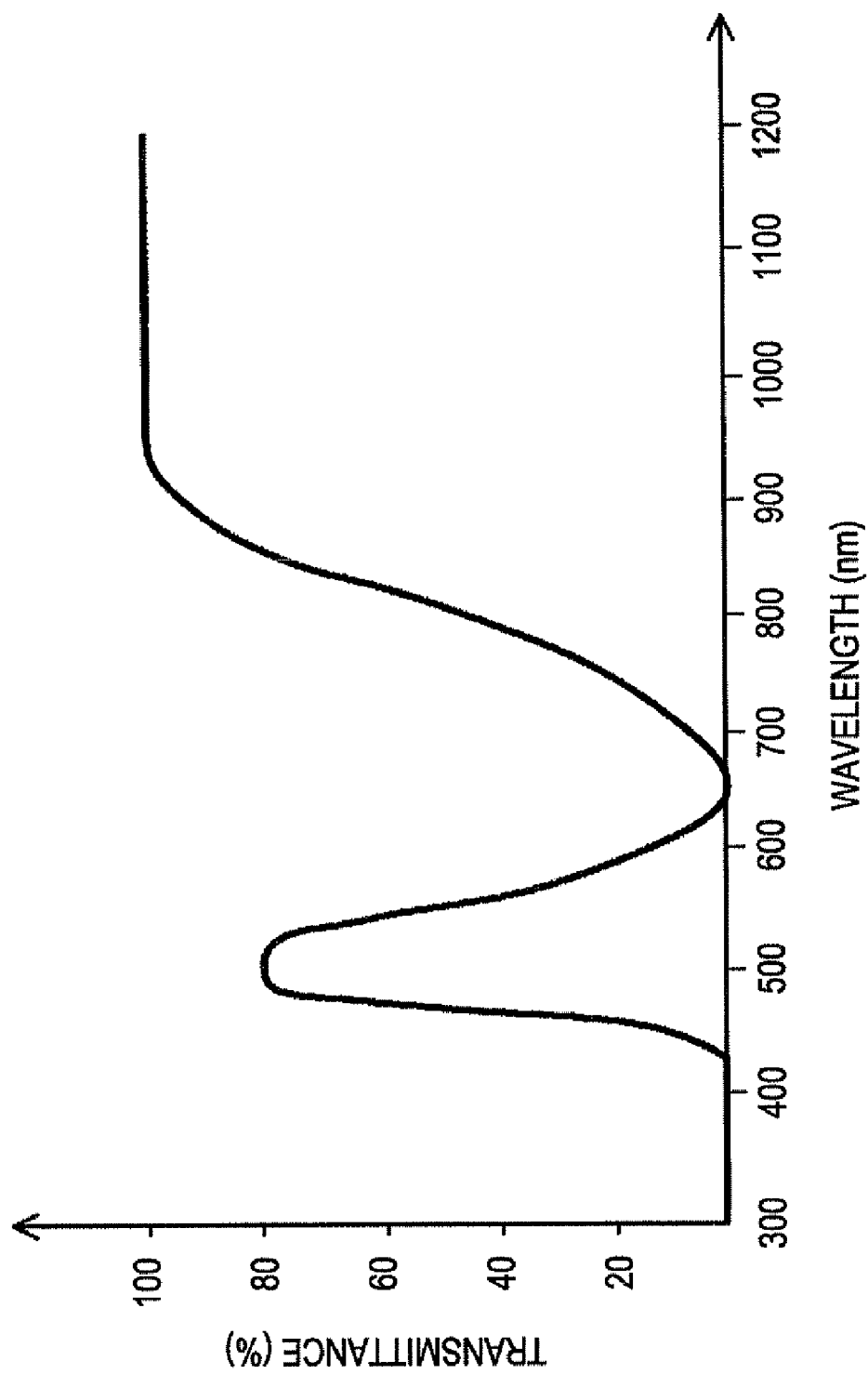
FIG. 9 is a graph illustrating the filter characteristic of a green color filter.

Here, a filter characteristic of the green color filter 64 will be described with reference to FIG. 9. FIG. 9 is a graph illustrating the filter characteristic of the green color filter 64.

As shown in FIG. 9, the green color filter 64 has a property of transmitting mainly a green light component and a light component (for example, a near-infrared light component) having a wavelength longer than that of the red light component and cutting off other light components. More specifically, the green color filter 64 cuts off a light component having a wavelength of about 450 nm or less, transmits a light component having a wavelength of about 450 nm to 650 nm with a transmittance corresponding to the wavelength, cuts off a light component having a wavelength of about 650 nm, transmits a light component having a wavelength of about 650 nm to 900 nm with a transmittance corresponding to the wavelength, and transmits a light component having a wavelength of about 950 nm or more with a transmittance of about 100%.

Accordingly, the ambient light transmitted through the green color filter 64 that has the filter characteristic shown FIG. 9 and light (for example, light from the backlight) other than the ambient light are incident on the photodiode 131. Accordingly, a light component (for example, a visible light component) having a wavelength near the green light of the ambient light, a light component (for example, a near-infrared light component) having a wavelength equal to or larger than the wavelength of the red light of the ambient light, and light (for example, light from the backlight) other than the ambient light are incident on the photodiode 131. Therefore, a heat current generated according to the environmental temperature around the photodiode 131, a received photocurrent (backlight photocurrent) generated when receiving light other than the ambient light, a received photocurrent (visible photocurrent component) generated when receiving a visible light component (for example, a light component having a wavelength of about 450 nm to 650 nm) of ambient light, and a received photocurrent (near-infrared photocurrent component) generated when receiving a near-infrared light component (for example, a light component having a wavelength of about 700 nm to 1200 nm) of ambient light are generated in the photodiode 131.

As a result, a 'received photocurrent (that is, a visible photocurrent component) generated when receiving a visible light component of ambient light', which is a difference between a light receiving result (that is, the heat current, the backlight photocurrent, the visible photocurrent component, and the near-infrared photocurrent component) in the photodiode 131 and a light receiving result (that is, the heat current, the backlight photocurrent, and the near-infrared photocurrent component) in the photodiode 132, is output to the light intensity calculation circuit 110. Therefore, according to the liquid crystal device 2 in the first modification, the light intensity of surrounding ambient light can be suitably detected similar to the liquid crystal device 1. As a result, the brightness of the backlight 141 can be suitably adjusted.

Particularly in the first modification, ambient light transmitted through the green color filter 64 is incident on the photodiode 131. Here, if it is taken into consideration that the spectral sensitivity characteristic of the green color filter 64 is relatively close to the relative luminosity characteristic of human eyes, the visible photocurrent component of the ambient light corresponding to the relative luminosity characteristic of human eyes can be output from the optical sensor 130 to the light intensity calculation circuit 110 in the liquid crystal device 2 in the first modification. That is, the spectral sensitivity characteristic (in particular, the spectral sensitivity characteristic with respect to ambient light of the whole optical sensor 130) as the whole optical sensor 130 can be brought relatively close to the relative luminosity characteristic of human eyes. Accordingly, the light intensity of surrounding ambient light can be detected more suitably. As a result, the brightness of the backlight 141 can be adjusted more suitably.

Furthermore, in the liquid crystal device 2 in the first modification, the green color filter 64 is used to make the spectral sensitivity characteristic of the whole optical sensor 130 close to the relative luminosity characteristic of human eyes. Accordingly, the configuration of the above-described liquid crystal device 2 can be realized without adding a special manufacturing process or using a special material. As a result, the above-described liquid crystal device 2 can be realized relatively easily or cheaply.

(4) Second Modification

Figure 10:
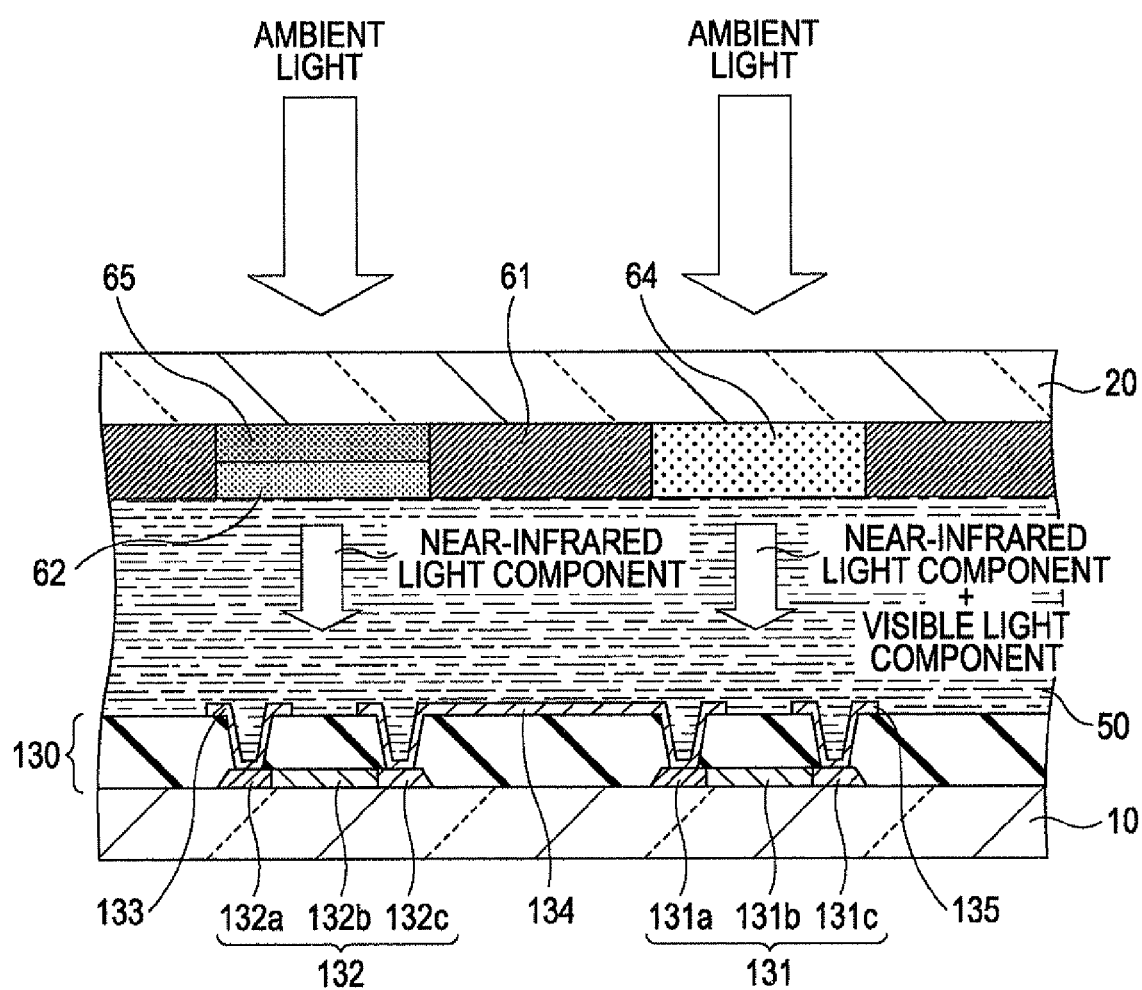
FIG. 10 is a cross-sectional view conceptually illustrating the more specific configuration of an optical sensor of a liquid crystal device in a second modification.

Next, a second modification of the liquid crystal device 1 according to the present embodiment will be described with reference to FIG. 10. Here, FIG. 10 is a cross-sectional view conceptually illustrating the more specific configuration of an optical sensor 130 of a liquid crystal device 3 in the second modification. In addition, the same components as in the liquid crystal device 1 or the liquid crystal device 2 are denoted by the same reference numerals, and a detailed explanation thereof will be omitted.

As shown in FIG. 10, the liquid crystal device 3 in the second modification has approximately the same configuration as the liquid crystal device 2 in the first modification. Particularly in the liquid crystal device 3 in the second modification, a green color filter 65 is further provided in a region portion of the counter substrate 20 facing the photodiode 132 in addition to the red color filter 62, compared with the liquid crystal device 2 in the first modification. The green color filter 65 may be the same color filter as the green color filter 64.

According to the liquid crystal device 3 having such a configuration, it becomes possible to detect as a difference a visible light component of about 500 nm to 700 nm, which could not be detected as the difference between the detection results of the photodiodes 131 and 132 in the case where only the red color filter 62 is provided like the first modification. As a result, the light intensity of surrounding ambient light can be detected more suitably. For example, the transmittance of a color filter for visible light having a wavelength around 560 nm is about 40% in the case of the green color filter 65 and about 20% in the case of the red color filter 62. Therefore, in the photodiode 132, about 8% of light is eventually received since the visible light having a wavelength around 560 nm is transmitted through the green color filter 65 and the red color filter 62. On the other hand, in the photodiode 131, about 40% of light, which corresponds to the transmittance of the green color filter 64, of the visible light having a wavelength around 560 nm is received. Accordingly, for the visible light having a wavelength around 560 nm, a difference occurs between the light receiving result in the photodiode 131 and the light receiving result in the photodiode 132. In this case, since it becomes possible to detect a portion corresponding to the difference as an ambient light component, the light intensity of surrounding ambient light can be detected more suitably. As a result, the brightness of the backlight 141 can be adjusted more suitably.

Particularly in the liquid crystal device 3 in the second modification, ambient light transmitted through the green color filter 64 or 65 is incident on each of the photodiodes 131 and 132. Therefore, a 'received photocurrent generated when receiving a visible photocurrent component (in particular, a visible photocurrent component of ambient light corresponding to the relative luminosity characteristic of human eyes) of ambient light', which is a difference between the light receiving result in the photodiode 131 and the light receiving result in the photodiode 132, can be detected with higher precision.

In addition, it is preferable that the green color filter 65 be provided to be located before the red color filter 62 when viewed from a side where the ambient light is incident on the liquid crystal device 3. That is, it is preferable that the green color filter 65 be provided to be located at the outer side of the liquid crystal device 3. In this case, the appearance (in particular, the appearance of a portion where each of the photodiodes 131 and 132 is disposed) of the liquid crystal device 3 can be matched with the appearance of the green color filter.

(5) Electronic Apparatus

Next, examples of an electronic apparatus including the above-described liquid crystal device 1 will be described with reference to FIGS. 11 and 12.

Figure 11:
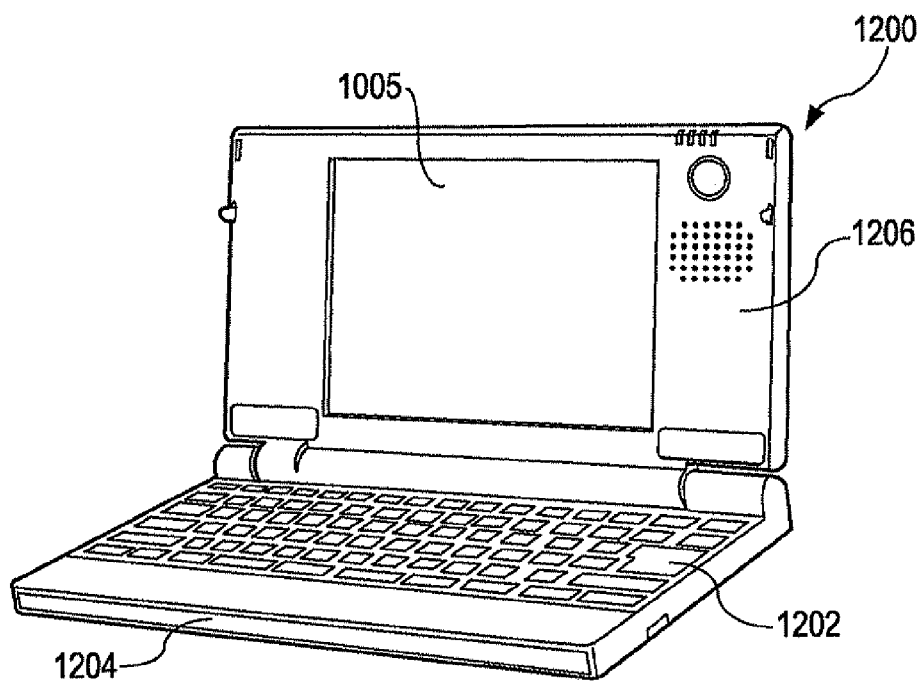
FIG. 11 is a perspective view illustrating a mobile type personal computer to which the liquid crystal device is applied.
Figure 12:
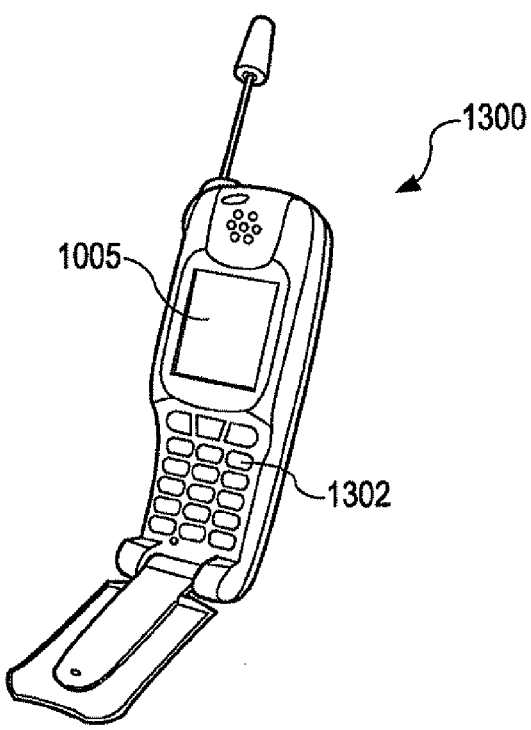
FIG. 12 is a perspective view illustrating a mobile phone to which the liquid crystal device is applied.

FIG. 11 is a perspective view illustrating a mobile type personal computer to which the liquid crystal device 1 is applied. Referring to FIG. 11, a computer 1200 is configured to include a main body 1204 having a keyboard 1202 and a liquid crystal display unit 1206 having the above-described liquid crystal device 1. The liquid crystal display unit 1206 is formed by adding a backlight on a back surface of the above-described liquid crystal device 1.

Next, an example in which the above-described liquid crystal device 1 is applied to a mobile phone will be described. FIG. 12 is a perspective view illustrating a mobile phone that is an example of the electronic apparatus. Referring to FIG. 12, a mobile phone 1300 includes a plurality of operation buttons 1302 and a liquid crystal device 1005 which adopts a transflective display method and has the same configuration as the liquid crystal device 1.

Also in these electronic apparatuses, the above-described various effects can be suitably obtained since the liquid crystal device 1 described above is included.

In addition to the electronic apparatuses described above with reference to FIGS. 11 to 12, a liquid crystal television, a view-finder-type or monitor-direct-view-type video tape recorder, a car navigation system, a pager, an electronic organizer, an electronic calculator, a word processor, a work station, a video phone, a POS terminal, an apparatus having a direct-view-type liquid crystal device with a touch panel, and the like may be exemplified. In addition, it is needless to say that the above-described liquid crystal device 1 may be applied to these various electronic apparatuses.

The invention is not limited to the above-mentioned embodiments but may be appropriately modified without departing from the subject matter and spirit of the invention read throughout the claims and specification. Photodetectors, electro-optical devices, and electronic apparatuses according to the modifications also fall within the technical scope of the invention.

The entire disclosure of Japanese Patent Application No. 2008-168932, filed Jun. 27, 2008 are expressly incorporated by reference herein.

What is claimed is:

1. A photodetector comprising:
   a first light receiving element that receives light including ambient light, the first light receiving element including a first light receiving element anode and a first light receiving element cathode;
   a second light receiving element that receives light including the ambient light, the second light receiving element including a second light receiving element anode and a second light receiving element cathode;
   and a red color filter disposed on an optical path through which the ambient light is incident on the second light receiving element,
   wherein, the first light receiving element and the second light receiving element are connected in series through a wiring line, the wiring line being connected to the first light receiving element anode and the second light receiving element cathode, and
   wherein the first light receiving element cathode is connected to a first potential, the second light receiving element anode is connected to a second potential, and the first potential is higher than the second potential.

2. The photodetector according to claim 1, further comprising:
   a first green color filter disposed on an optical path through which the ambient light is incident on the first light receiving element.

3. The photodetector according to claim 2, further comprising:
   a second green color filter disposed on the optical path through which the ambient light is incident on the second light receiving element.

4. The photodetector according to claim 3, wherein the second green color filter is located before the red color filter when viewed from a side where the ambient light is incident on the second light receiving element.

5. The photodetector according to claim 1, further comprising:
   a detection circuit that detects a visible light component of the ambient light on the basis of a difference between a light receiving result in the first light receiving element and a light receiving result in the second light receiving element.

6. A photodetector comprising:
   first and second light receiving elements, each of which receives light including ambient light and has a light receiving sensitivity to at least a visible light component of the ambient light, the first light receiving element including a first light receiving element anode and a first light receiving element cathode, and the second light receiving element including a second light receiving element anode and a second light receiving element cathode;
   a detection circuit that detects a visible light component of the ambient light on the basis of a difference between a light receiving result in the first light receiving element and a light receiving result in the second light receiving element; and
   a filter that is disposed on an optical path through which the ambient light is incident on the second light receiving element and that cuts off the visible light component and transmits a near-infrared light component,
   wherein the first and second light receiving elements are connected in series through a wiring line, the wiring line being connected to the first light receiving element anode and the second light receiving element cathode, and
   wherein the first light receiving element cathode is connected to a first potential, the second light receiving element anode is connected to a second potential, and the first potential is higher than the second potential, and
   wherein each of the first and second light receiving elements is foamed on a substrate by a low temperature poly silicon process.

7. An electro-optical device comprising the photodetector according to claim 1.

8. The electro-optical device according to claim 7, further comprising:
   a light source that supplies light to the electro-optical device; and
   an adjustment circuit that controls an amount of light of the light source on the basis of a difference between a light receiving result in the first light receiving element and a light receiving result in the second light receiving element.

9. An electronic apparatus comprising the electro-optical device according to claim 7.

* * * * *